(12) United States Patent
Ohishi et al.

(10) Patent No.: US 6,473,716 B1
(45) Date of Patent: Oct. 29, 2002

(54) THREE-DIMENSIONS MEASURING METHOD AND SURVEYING EQUIPMENT USING THE SAME

(75) Inventors: Masahiro Ohishi; Masaki Takanashi, both of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/516,817

(22) Filed: Mar. 1, 2000

Related U.S. Application Data

(63) Continuation of application No. PCT/JP99/05111, filed on Sep. 20, 1999.

(30) Foreign Application Priority Data

Sep. 21, 1998 (JP) .......................................... 10-286096

(51) Int. Cl.$^7$ ................................................. G01C 5/00
(52) U.S. Cl. ......................................... 702/152; 356/3
(58) Field of Search ................................. 702/152, 153, 702/159, 164; 356/3.01, 3.02, 3.03, 3.04, 3.05, 3.06, 3.07, 3.08, 3

(56) References Cited

U.S. PATENT DOCUMENTS

| | | | | |
|---|---|---|---|---|
| 5,724,447 A | * | 3/1998 | Fukushima | ................. 382/211 |
| 5,757,674 A | * | 5/1998 | Marugame | .................. 364/559 |
| 5,832,106 A | * | 11/1998 | Kim | ............................ 382/154 |
| 5,973,788 A | * | 10/1999 | Pettersen et al. | ........... 356/375 |
| 6,046,800 A | * | 4/2000 | Ohtomo et al. | .......... 356/141.1 |

FOREIGN PATENT DOCUMENTS

| | | |
|---|---|---|
| JP | 424504 | 1/1992 |
| JP | 694417 | 4/1994 |

* cited by examiner

*Primary Examiner*—Patrick Assouad
(74) *Attorney, Agent, or Firm*—BakerBotts LLP

(57) ABSTRACT

The present invention aims to provide a lightwave range finder and a measuring method or the like, which are capable of computing arbitrary three-dimensional coordinate positions, distances and areas or the like from distance and angular data, etc. The present invention can specify at least three points on a plane α including measuring points of an object to be measured, measure distances to and angles relative to at least three points corresponding to the specified points as viewed from a point of origin, determine an equation for specifying the plane α, using data about the distances and angles, collimate the measuring points from the point of origin to measure angles, determine an equation indicative of a straight line connecting between the point of origin and each measuring point, and compute a measuring point corresponding to a point where the equation for specifying the plane α and the equation indicative of the straight line connecting between the point of origin and each measuring point intersect.

21 Claims, 9 Drawing Sheets

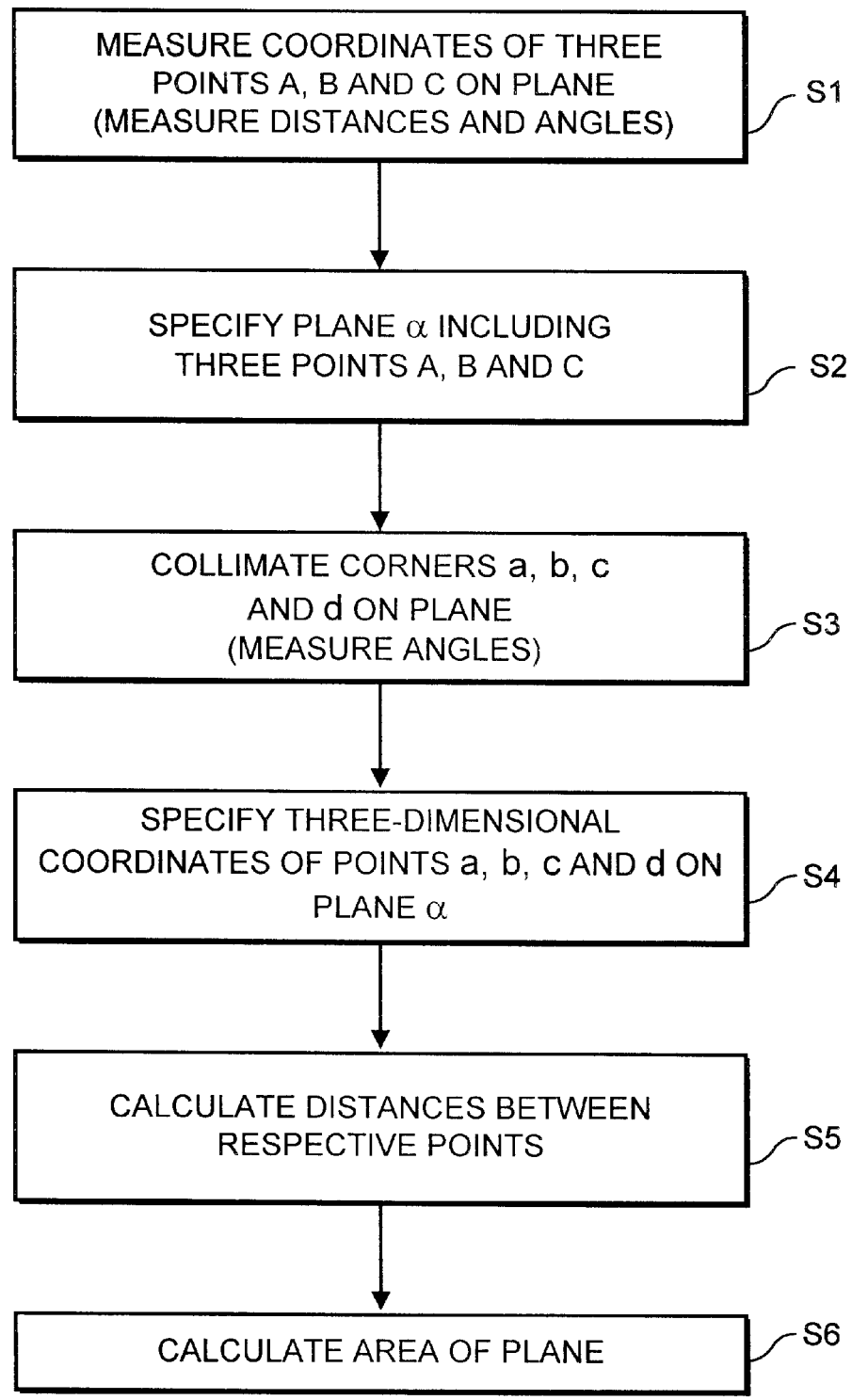
F I G. 5

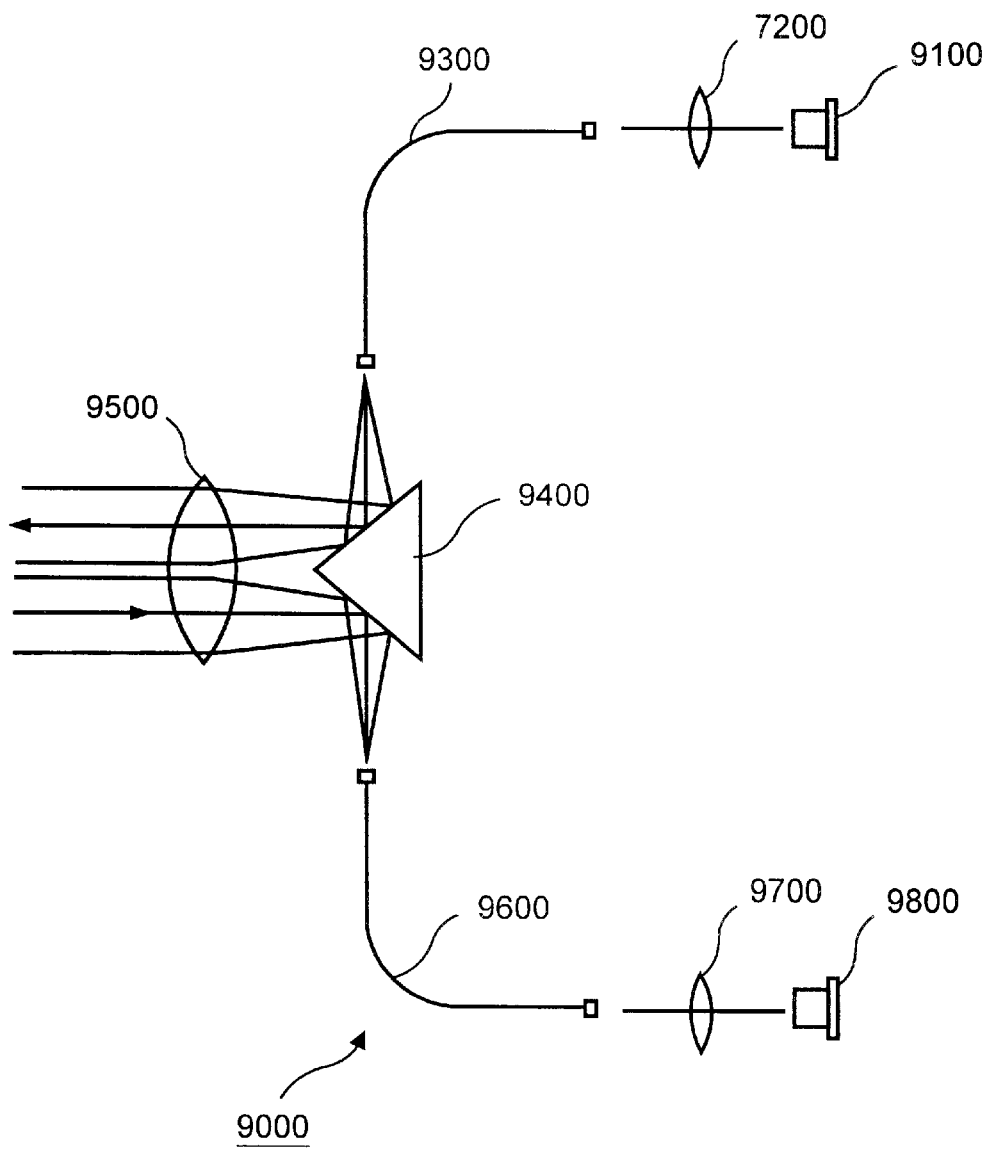
F I G. 6

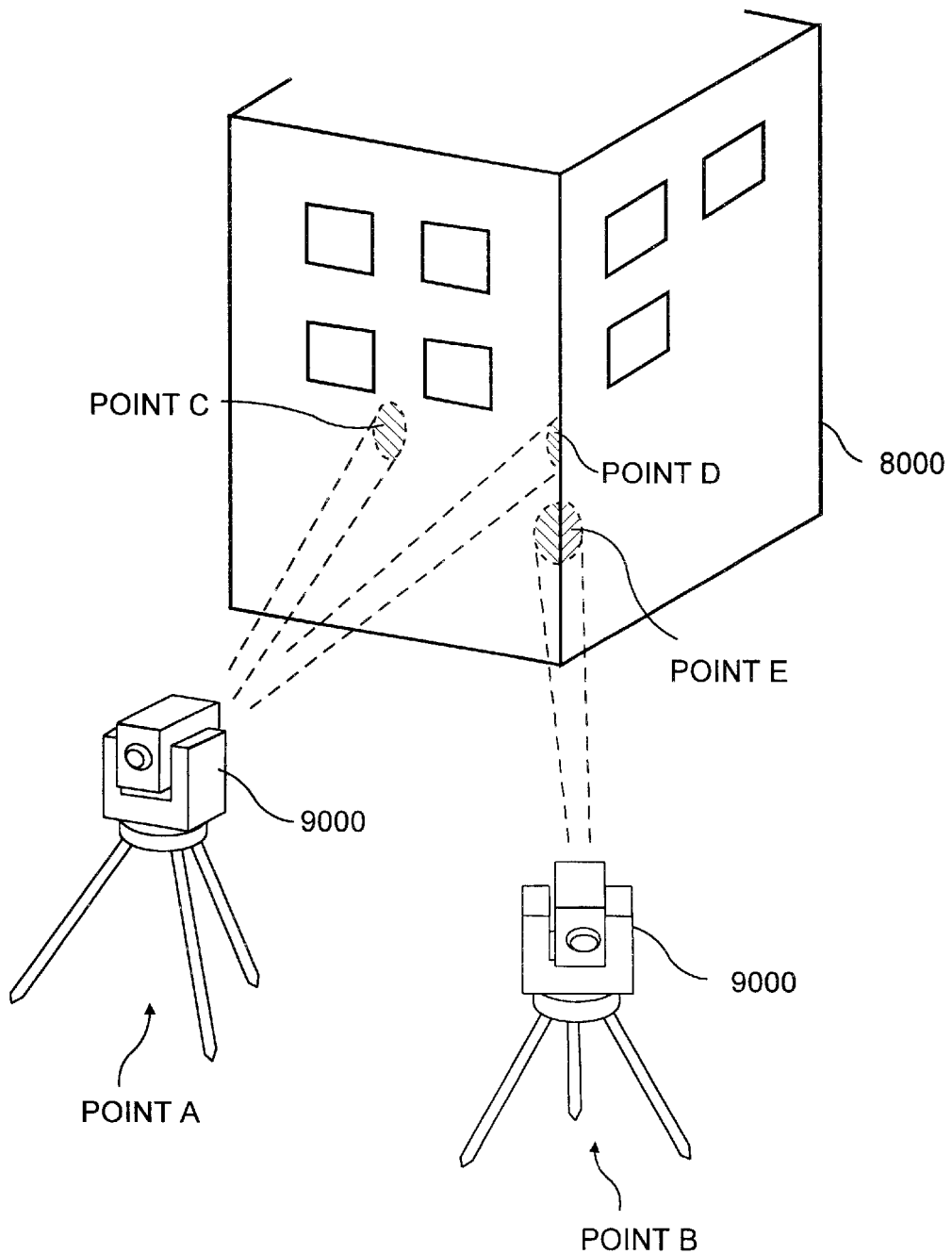
F I G. 7

THREE-DIMENSIONS MEASURING METHOD AND SURVEYING EQUIPMENT USING THE SAME

This application is a continuation of Application PCT/JP99/054 9/20.

TECHNICAL FIELD

The present invention relates to a non-prism type lightwave range finder or the like which measures a distance to an object without having to use a corner cube, and particularly to a lightwave range finder and a measuring method, which are capable of computing arbitrary three-dimensional coordinate positions, distances and areas or the like from distance and angular data, etc.

BACKGROUND ART

A lightwave range finder capable of measuring distances without having to use a corner cube has heretofore been in existence. This type of conventional lightwave range finder 9000 comprises a light source 9100, a collimator lens 9200, a fiber 9300 on the light-emitting side, a prism 9400, an objective lens 9500, a fiber 9600 on the light-receiving side, a light-receptive lens 9700 and a light receptor 9800.

The light source 9100 makes use of a pulse semiconductor laser and is pulse-driven by a laser driving circuit. A lightwave pulse emitted from the light source 9100 is introduced into the fiber 9300 on the light-emitting side through the collimator lens 9200 so as to be launched into the prism 9400. Further, the lightwave pulse reflected by the prism 9400 passes through the objective lens 9500 so as to be radiated toward an object to be measured.

After the lightwave pulse reflected from the object to be measured has passed through the objective lens 9500, it is reflected by the prism 9400, followed by launching into the fiber 9600 on the light-receiving side. Further, the lightwave pulse introduced by the fiber 9600 on the light-receiving side is launched into the light receptor 9800 through the light-receptive lens 9700. The lightwave pulse received by the light receptor 9800 is converted to an electric signal, which in turn is processed by a suitable arithmetic processing means to thereby obtain a distance-measuring value.

The fiber 9300 on the light-emitting side makes use of one whose diameter is normally about several hundred $\mu$m. This originates from the fact that the size of a light-emitting unit of the pulse semiconductor laser serving as the light source for emission is about several hundred $\mu$m.

As the objective lens 9500, one is used wherein an effective diameter thereof is several tens of mm and a focal length thereof is about 100 mm. This results from a widened angle of the light-emitting unit of the pulse semiconductor laser serving as the light source for emission. Namely, this is because the objective lens 9500 needs to cover a certain degree of solid angle for the purpose of emitting produced light from the objective lens 9500 with good efficiency.

Further, the pulse light radiated toward the object to be measured from the objective lens 9500 spreads as it propagates far away because the diameter of the fiber 9300 on the light-emitting side has a finite size. If the focal length of the objective lens 9500 is regarded as 100 mm and the diameter of the fiber 9300 on the light-emitting side is 100 $\mu$m, for example, then the pulse light is spread to 100 mm as it is kept away by a distance of 100 m.

Thus, since the magnitude of a measuring ray bundle, which is applied to the object to be measured, reaches several ten of mm or more, the lightwave range finder 9000 freed from the use of the corner cube actually measures a surface without measuring points on the surface of the measuring object.

The measurement of a building 8000 through the use of the corner cube-free lightwave range finder 9000 will now be explained based on FIG. 7.

Now consider where the sides of the building 8000 are measured.

When the corner cube-free lightwave range finder 9000 is installed at a point A to measure a point C of the building 8000, it can measure the point C without any problem in practice since the size of the point C corresponding to the object to be measured is sufficiently greater than the magnitude of the measuring ray bundle.

However, when the size and position of a specific portion of the building 8000 shown in FIG. 7 are measured, it is necessary to measure a specific corner. When, for example, a point D corresponding to the corner is measured, a surface including the corner is actually measured because a measuring ray bundle has a certain degree of magnitude even if measuring light is applied to the point D, whereby the corner cannot be measured accurately.

Further, when the corner cube-free lightwave range finder 9000 is placed in a point B to measure a point E of the building 8000, measuring light is applied not only to the point E but also to the sides thereof, so that the resultant measured value results in one received from the measuring light applied to the two surfaces, thus causing a problem that the point E corresponding to the corner cannot be measured accurately.

A survey of a cylindrical column 7000 will next be described based on FIG. 8. There may be cases where the measurements of the positions of an electric-light pole and trees or the like are required upon a survey under the present conditions. Now consider where the cylindrical column 7000 is measured by a normal lightwave range finder 9001. FIG. 9 is a diagram showing this state as viewed from above. First of all, a user places a corner cube 9002 on the surface of the cylindrical column 7000. Further, the user makes use of the normal lightwave range finder 9001 to measure a distance L to the corner cube 9002.

Next, the radius R of the cylindrical column 7000 is measured with the eye or through the use of a surveying tape or the like.

Further, a distance L' to the center o of the cylindrical column 7000 can be determined by the following equation:

$$L' = L + R$$

However, while the distance L to the surface of the cylindrical column 7000 can be measured without the installation of the corner cube 9002 where the corner cube-free lightwave range finder 9000 is used, the diameter R of the cylindrical column 7000 cannot be obtained. Therefore, a problem arises in that the distance L' to the center O of the cylindrical column 7000 cannot be obtained.

If an operator approaches or comes up to the cylindrical column 7000 and measures the radius R of the cylindrical column 7000 with his or her eyes or by using the surveying tape or the like, then the distance L' to the center O of the cylindrical column 7000 can be determined. However, a problem arises in that if the operator approaches an object to be measured, there is little merit in using the corner cube-free lightwave range finder 9000 and work simplification cannot be achieved.

Accordingly, a serious problem arises in that while the corner cube-free lightwave range finder 9000 has an excellent merit that it is unnecessary to place the corner cube in a measuring position, it is difficult to measure each corner of a measured object because a measuring ray bundle has a finite magnitude, so that the outside shape, size and the like thereof cannot be measured accurately.

DISCLOSURE OF INVENTION

The present invention can specify at least three points on a plane a including measuring points of an object to be measured, measure distances to and angles relative to at least three points corresponding to the specified points as viewed from a point of origin, determine an equation for specifying the plane $\alpha$, using data about the distances and angles, collimate the measuring points from the point of origin to thereby measure angles, determine an equation indicative of a straight line connecting between the point of origin and each measuring point, and compute a measuring point corresponding to a point where the equation for specifying the plane $\alpha$ and the equation indicative of the straight line connecting between the point of origin and each measuring point intersect.

The point of origin employed in the present invention may also be defined as a point where a surveying apparatus or surveying equipment is installed.

Further, the surveying equipment according to the present invention can also be defined as a lightwave range finder which makes no use of a corner cube.

The object to be measured employed in the present invention is a three-dimensional object, the plane $\alpha$ is one surface of the three-dimensional object, and the measuring points may also be corners on the plane $\alpha$.

In the present invention as well, the measuring points are two points, and three-dimensional coordinates of the two points can be computed and the distance between the two points can also be computed.

Further, in the present invention, the measuring points are at least three points, and three-dimensional coordinates of at least the three points can be computed and an area surrounded by these points can also be computed.

The present invention specifies at least three points on a plane a including measuring points of an object to be measured, measures distances to and angles relative to at least three points corresponding to the specified points as viewed from a point of origin, specifies at least three points on a plane $\beta$ including measuring points of an object to be measured, measures distances to and angles relative to at least three points corresponding to the specified points from the point of origin, determines an equation for specifying the plane $\alpha$, using data the distances and angles, determines an equation for specifying the plane $\beta$, using data about the distances and angles, collimates the measuring points from the point of origin to thereby measure angles, determines an equation indicative of a straight line connecting between the point of origin and each measuring point, computes a measuring point corresponding to a point where the equation for specifying the plane $\alpha$ and the equation indicative of the straight line connecting between the point of origin and each measuring point intersect, and computes a measuring point corresponding to a point where the equation for specifying the plane $\beta$ and the equation indicative of the straight line connecting between the point of origin and each measuring point intersect. At least two points corresponding to the measuring point on the plane $\alpha$ and the measuring point on the plane $\beta$ are common.

Further, the point of origin employed in the present invention can be defined as a point where surveying equipment is installed.

The surveying equipment or apparatus according to the present invention may also be defined as a lightwave range finder which makes no use of a corner cube.

The specified points employed in the present invention are four or more points and the plane can also be specified by a least square method.

Furthermore, the present invention can measure a distance to an external surface of a cylindrical column corresponding to an object to be measured, collimate the outside shape of the cylindrical column to thereby measure an angle thereof, and compute a distance to the center of the cylindrical column from the distance and angle, or the radius of the cylindrical column by a tri-square theorem.

The surveying apparatus according to the present invention is a lightwave range finder for measuring distances and angles. The lightwave range finder includes an angle measuring unit and a distance measuring unit. The angle measuring unit and distance measuring unit can measure distances to and angles relative to at least three specified points on a plane a including measuring points of an object to be measured. The angle measuring unit can measure angles relative to each individual measuring points. The computing unit can determine an equation for specifying the plane $\alpha$ from the distances to and angles relative to the specified points, determine an equation indicative of a straight line for connecting the measuring points from the angles relative to the measuring points, and compute a measuring point corresponding to a point where the plane $\alpha$ and the straight line intersect.

The object to be measured by the surveying apparatus according to the present invention is a three-dimensional object, the plane a is one surface of the three-dimensional object, and the measuring points may also be corners on the plane $\alpha$.

The points measured by the surveying apparatus according to the present invention are two points. The computing unit can compute three-dimensional coordinates of the two points and also compute the distance between the two points.

The points measured by the surveying apparatus according to the present invention are at least three points. The computing unit can compute three-dimensional coordinates of at least the three points and also compute an area surrounded by these points.

An electronic storage medium according to the present invention describes therein procedures or the like for allowing an angle measuring unit to measure angles up to at least three specified points on a plane $\alpha$ including measuring points of an object to be measured, allowing a distance measuring unit to measure distances to at least the three specified points on the plane $\alpha$ including the measuring points of the object to be measured, allowing the angle measuring unit to measure angles relative to the measuring points, and allowing a computing unit to determine an equation for specifying the plane $\alpha$ from the distances to and the angles relative to the specified points, determine an equation indicative of a straight line connecting the measuring points from the angles relative to the measuring points, and compute a measuring point corresponding to a point where the plane a and the straight line intersect.

Further, an electronic storage medium according to the present invention describes therein procedures for allowing an angle measuring unit to measure angles up to at least three specified points on a plane $\alpha$ including measuring points of an object to be measured and angles up to at least three specified points on a plane β including measuring points of an object to be measured, allowing a distance measuring unit to measure distances up to at least the three specified points on the plane a including the measuring points of the object to be measured and distances up to at least the three specified points on the plane β including the measuring points of the object to be measured, allowing the angle measuring unit to measure angles relative to the measuring points, and allowing a computing unit to determine an equation for specifying the plane α and an equation for specifying the plane β from the distances to and the angles relative to the specified points, determine an equation indicative of a straight line connecting the measuring points from the angles relative to the measuring points, and compute a measuring point corresponding to a point where the plane α or β and the straight line intersect.

In the electronic storage medium according to the present invention, at least two points corresponding to the measuring point on the plane α and the measuring point on the plane β can also be made common.

In the electronic storage medium according to the present invention as well, the object to be measured is a three-dimensional object, the plane α is one surface of the three-dimensional object, and the measuring points may also be corners on the plane α.

Further, the electronic storage medium according to the present invention describes therein procedures or the like for setting the measuring points to two points and allowing the computing unit to compute three-dimensional coordinates of the two points and compute the distance between the two points.

Furthermore, the electronic storage medium according to the present invention describes therein procedures or the like for setting the measuring points to at least three points and allowing the computing unit to compute three-dimensional coordinates of at least the three points and compute an area surrounded by these points.

BRIEF DESCRIPTION OF DRAWINGS

FIG. 5 is a diagram showing one example of the function of the present embodiment.

FIG. 6 is a diagram for describing a prior art.

FIG. 7 is a diagram for describing another prior art.

BEST MODE FOR CARRYING OUT THE INVENTION

Figure 1:
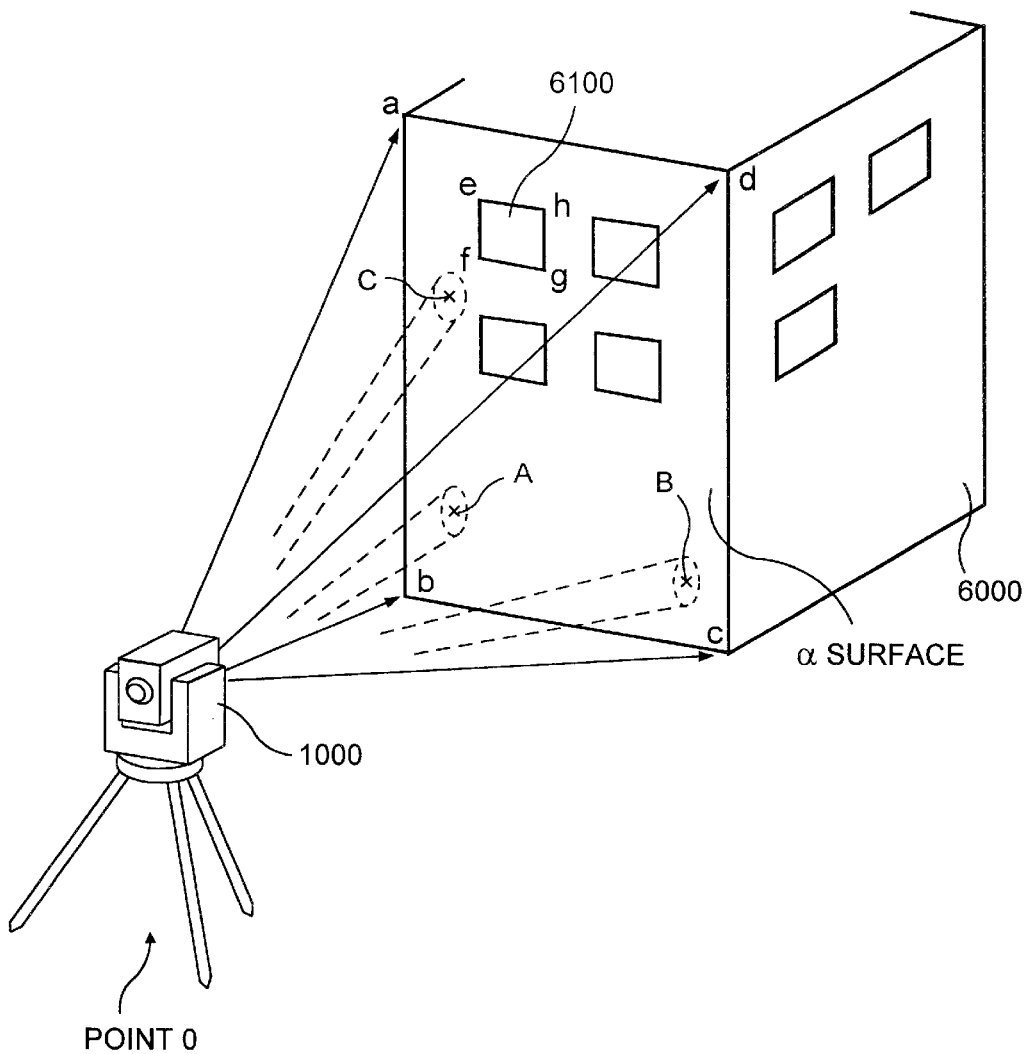
FIG. 1 is a diagram for describing the principle of the present invention.

The principle of the present invention will first be explained with reference to FIG. 1. Now consider where a lightwave range finder 1000, which does not make use of a corner cube, is first placed at a point O to measure a building 6000 which is an object to be measured. The building 6000 can be considered to be a rectangular parallelepiped. Respective surfaces thereof can be regarded as planes.

The corner cube-free lightwave range finder 1000 is of a type called integral-type capable of measuring distances and angles. Incidentally, the optical axis of a distance measuring unit of the corner cube-free lightwave range finder 1000 and a collimation system will be defined as coaxial with each other.

Points A, B and C on a α surface of the building 6000 are first measured. Data obtained at the respective points A, B and C result in data about distances and angles as viewed from a point of origin in three-dimensional space with a point O (corresponding to the point where the corner cube-free lightwave range finder 1000 is installed) as the point of origin. It is thus possible to obtain or determine the positions of coordinates of the respective points A, B and C in three-dimensional space. Since the plane including the three points in three-dimensional space is uniquely determined, the α surface containing the measured points A, B and C is uniquely determined.

The positions of the coordinates of the points A, B and C in three-dimensional space with the point O as the point of origin can be determined from the following equations.

If the coordinates of the point A are given as ($X_A$, $Y_A$ and $Z_A$), then they are represented as follows:

$$X_A = L_p \quad \text{... first equation}$$

$$Y_a = L_m \quad \text{... first equation}$$

$$Z_A = L_n \quad \text{... first equation}$$

where e : direction cosine in x direction when the point A is defined as collimation m: direction cosine in y direction when the point A is defined as collimation n: direction cosine in z direction when the point A is defined as collimation Further, if the coordinates of the points A, B and C are given as follows:

A: ($x_1$, $y_1$, $z_1$)

B: ($x_2$, $y_2$, $z_2$)

C: ($x_3$, $y_3$, $z_3$)

then an equation for expressing the α surface corresponding to the plane is represented as follows:

$$\begin{bmatrix} x & y & z & 1 \\ x_A & y_A & z_A & 1 \\ x_B & y_B & z_B & 1 \\ x_C & y_C & z_C & 1 \end{bmatrix} = 0 \quad \text{second equation}$$

An angle a of a plane in which one desires to measure its position, is next collimated. From angular data at this time, an equation indicative of a straight line which passes through the point 0 (corresponding to the point where the corner cube-free lightwave range finder 1000 is installed) and a collimation point α, can be represented as follows:

$$x/e = y/m = z/n \ldots \quad \text{third equation}$$

where n: direction cosine in x direction m: direction cosine in y direction n: direction cosine in z direction Further, the coordinates of the collimation point a in three-dimensional space with the point 0 (corresponding to the point where the corner cube-free lightwave range finder 1000 is placed) as the point of origin, can be determined by solving the second and third equations as simultaneous equations. Namely, the $x_A$ coordinate of the point a can be represented as follows:

$$\begin{bmatrix} x & m*x/l & n*x/l \\ x_A & y_A & z_A \\ x_B & y_B & z_B \\ x_C & y_C & z_C \end{bmatrix} = 0 \quad \text{fourth equation}$$

The $Y_A$ coordinate of the point α can be represented as follows:

$$\begin{bmatrix} l*y/m & y & m*y/n \\ x_A & y_A & z_A \\ x_B & y_B & z_B \\ x_C & y_C & z_C \end{bmatrix} = 0 \quad \text{fifth equation}$$

The $Z_A$ coordinate of the point α can be represented as follows:

$$\begin{bmatrix} l*z/n & m*z/n & z \\ x_A & y_A & z_A \\ x_B & y_B & z_B \\ x_C & y_C & z_C \end{bmatrix} = 0 \quad \text{sixth equation}$$

Further, a distance $L_A$ between the point 0 (corresponding to the point where the corner cube-free lightwave range finder 1000 is placed) and the collimation point α is represented by the following equation:

$L_A = (X_A^2 + Y_A^2 + Z_A^2)^{0.5}$ ... seventh equation

Even in the case of b, c and d corresponding to other corners on the a surface, their positions on the three-dimensional coordinates can be obtained in the same manner as described above.

Thus, the positions on the three-dimensional coordinates, of a, b, c and d corresponding to other corners on the α surface can be determined.

Further, the lengths of the sides of the a surface, the area thereof, etc. can be determined by calculation based on the three-dimensional coordinates of the respective points a, b, c and d.

Arbitrary points on the plane can be determined without limitations to the angles of the plane in that since the equations indicative of the α surface corresponding to the plane have already been obtained, the positions of the three-dimensional coordinates can be indirectly determined from the angular data at collimation. Now consider a window 6100 in the building 6000, for example. If four points e, f, g and h thereof are measured, then three-dimensional coordinates thereof can be determined.

While the equations indicative of the α surface are computed using the data about the distances to and angles relative to the three points A, B and C, they are not limited to the three points. A least square method or the like may also be utilized through the use of data obtained by measuring four or more points, whereby high-accuracy measurements can be also carried out.

Figure 2:
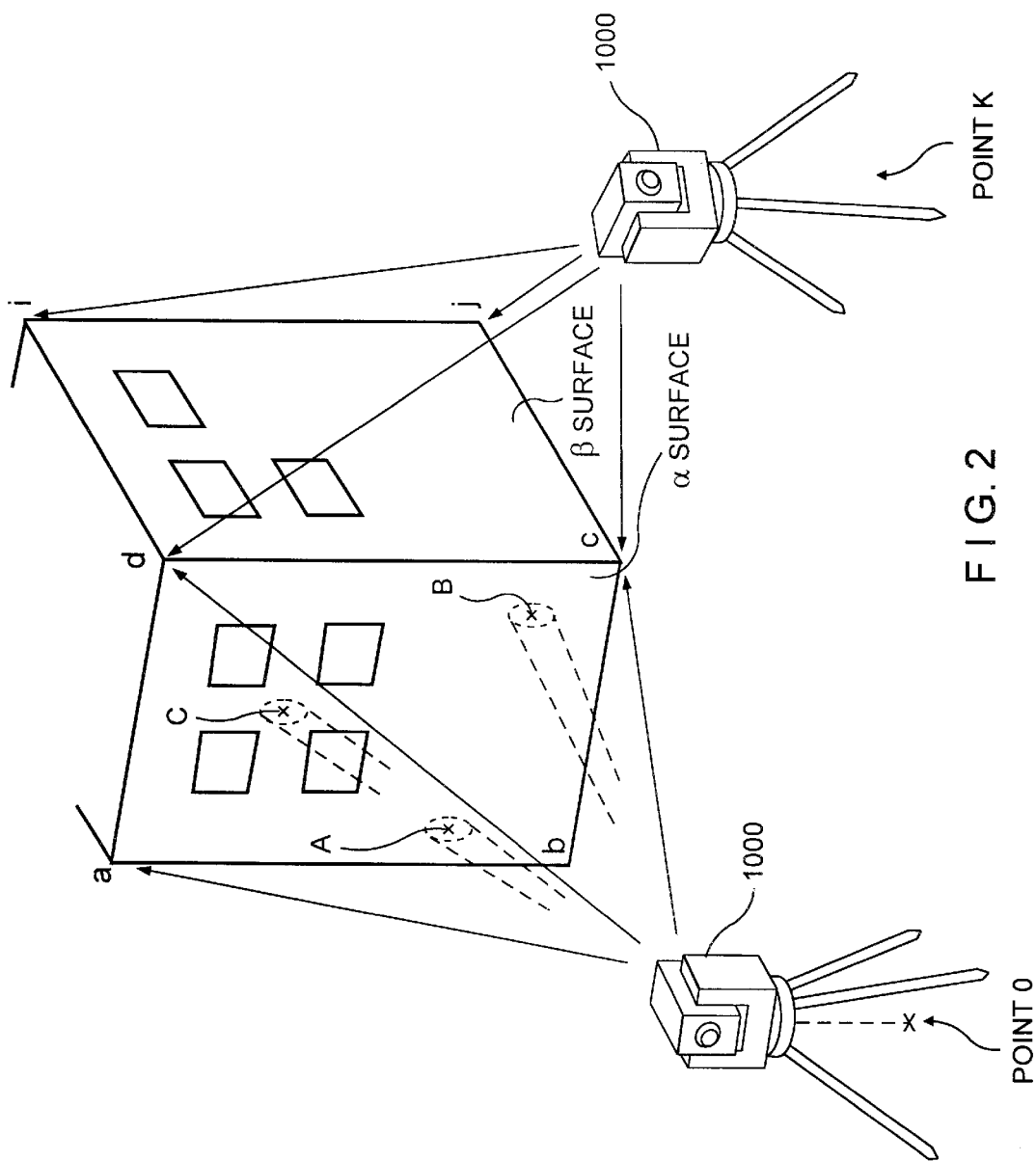
FIG. 2 is a diagram for describing the principle of the present invention.

The point where the corner cub-free lightwave range finder 1000 is installed, is next shifted from the point 0 to a point K as show in FIG. 2. If the α surface and β surface corresponding to another plane are measured and measuring points (points c and d) common to the α surface are observed, an equation indicative of the β surface can be converted into form represented by the same three-dimensional coordinates as the equation indicative of the α surface. Thus, data on the β surface and data on the α surface can be represented by the same three-dimensional coordinates.

Further, if all the angles of the building 6000 are measured, it is then possible to determine the volume of the building 6000.

Figure 3:
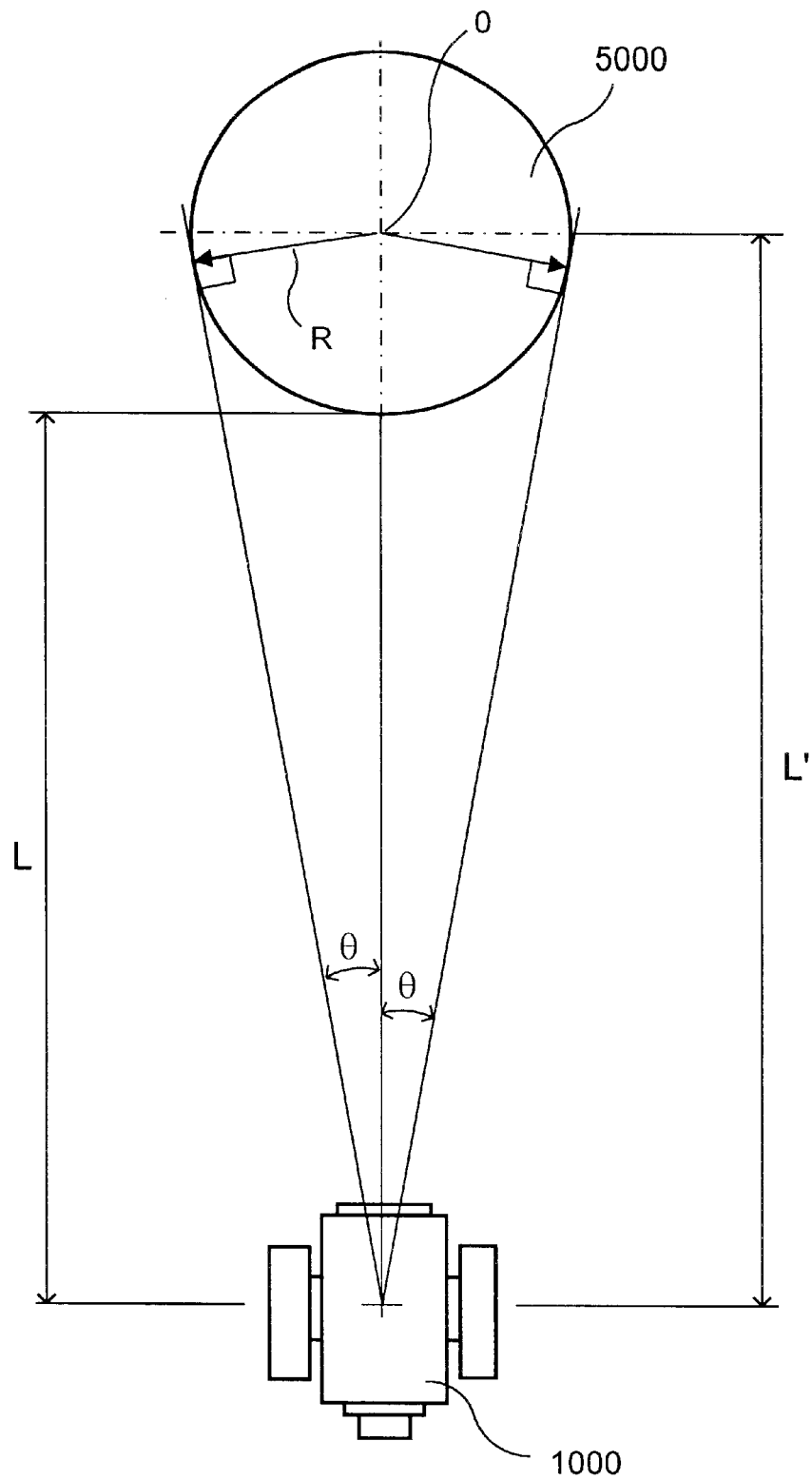
FIG. 3 is a diagram for describing the principle of the present invention.

A distance L to the surface of a cylindrical column 5000 is measured by the lightwave range finder 100 as shown in FIG. 3. Next, if the outside shape of the cylindrical column 5000 is collimated to determine an angle Θ, then the radius R of the cylindrical column 5000 is given according to the tri-square theorem as follows:

R = (sinΘ/(1 −sinΘ))*L    ... eighth equation

A distance to the center of the cylindrical column 5000 can be also obtained according to the tri-square theorem as follows:

L' = (1(1−sinΘ))*L ...    ninth equation

An embodiment of the present invention will be explained with reference to the drawings.

Figure 4:
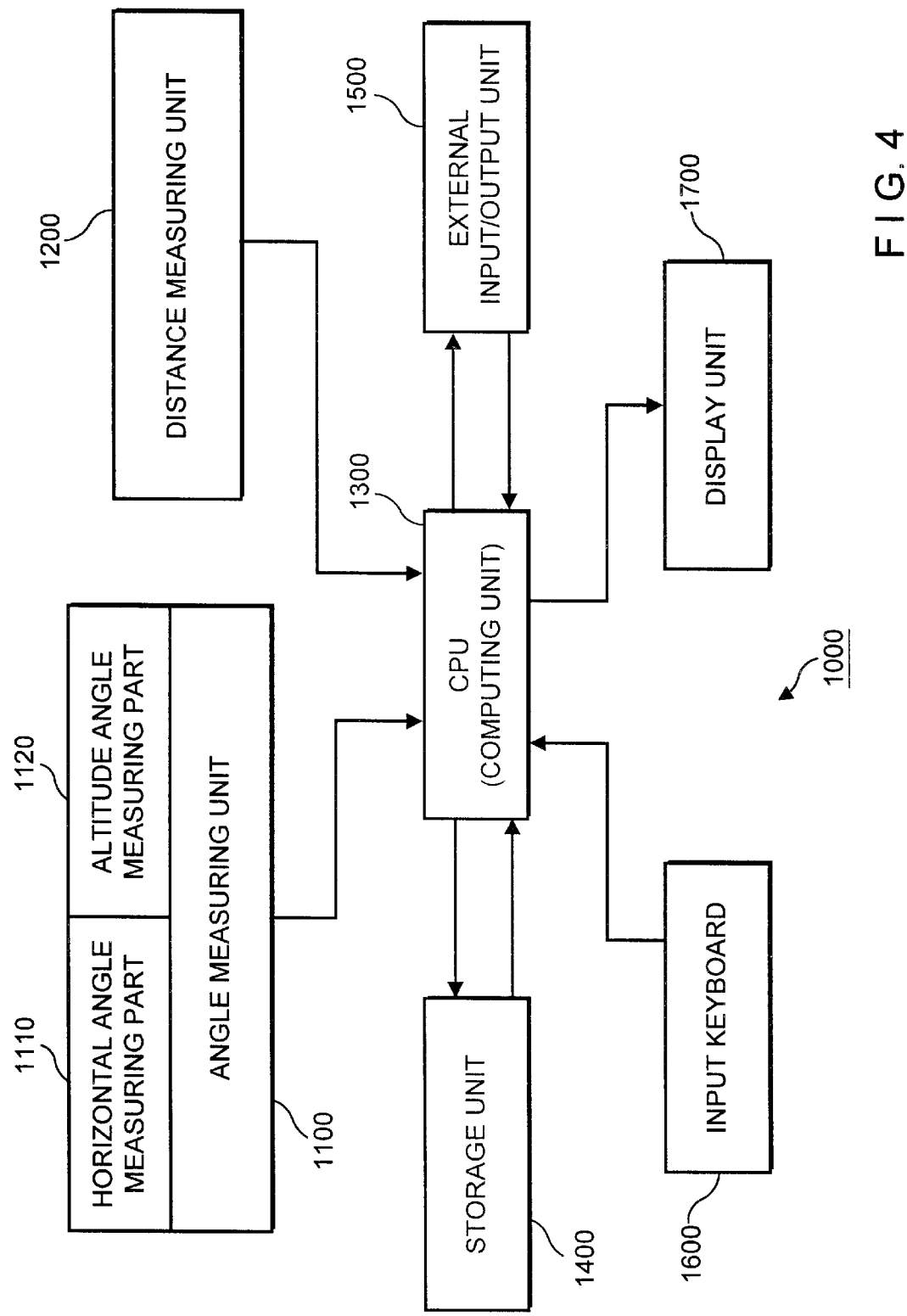
FIG. 4 is a diagram for describing the structure of a lightwave range finder showing an embodiment of the present invention.
Figure 8:
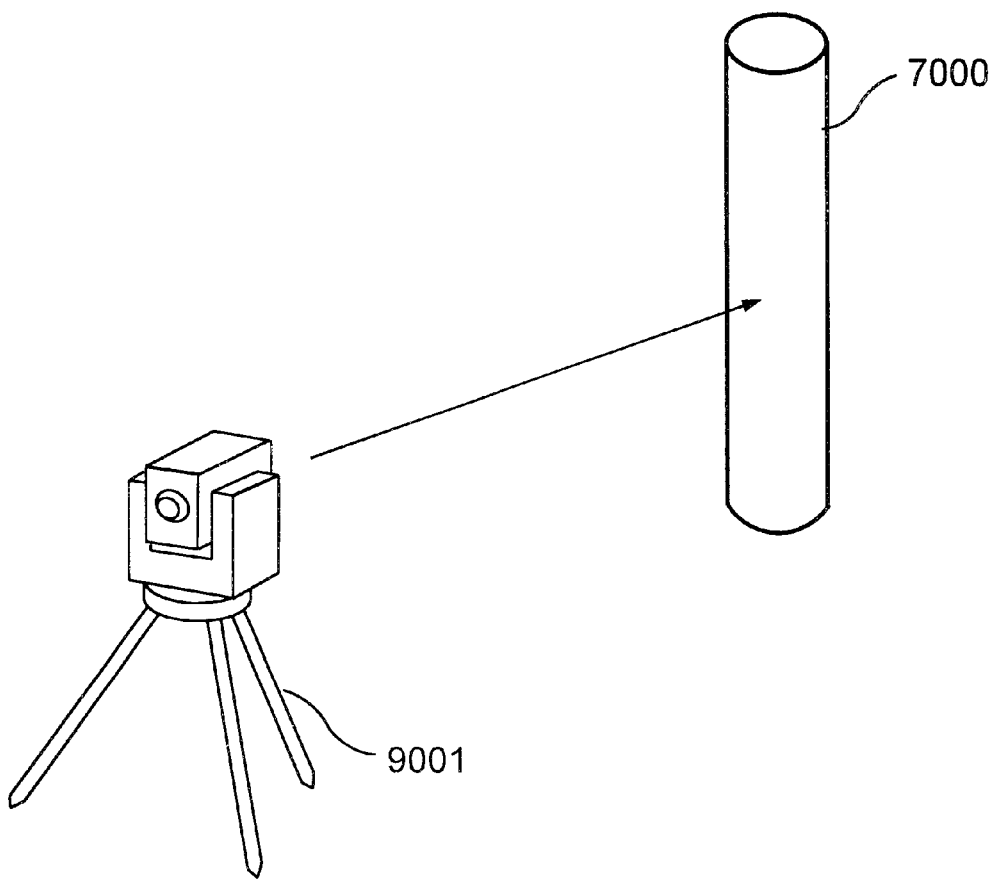
FIG. 8 is a diagram for describing a further prior art.
Figure 9:
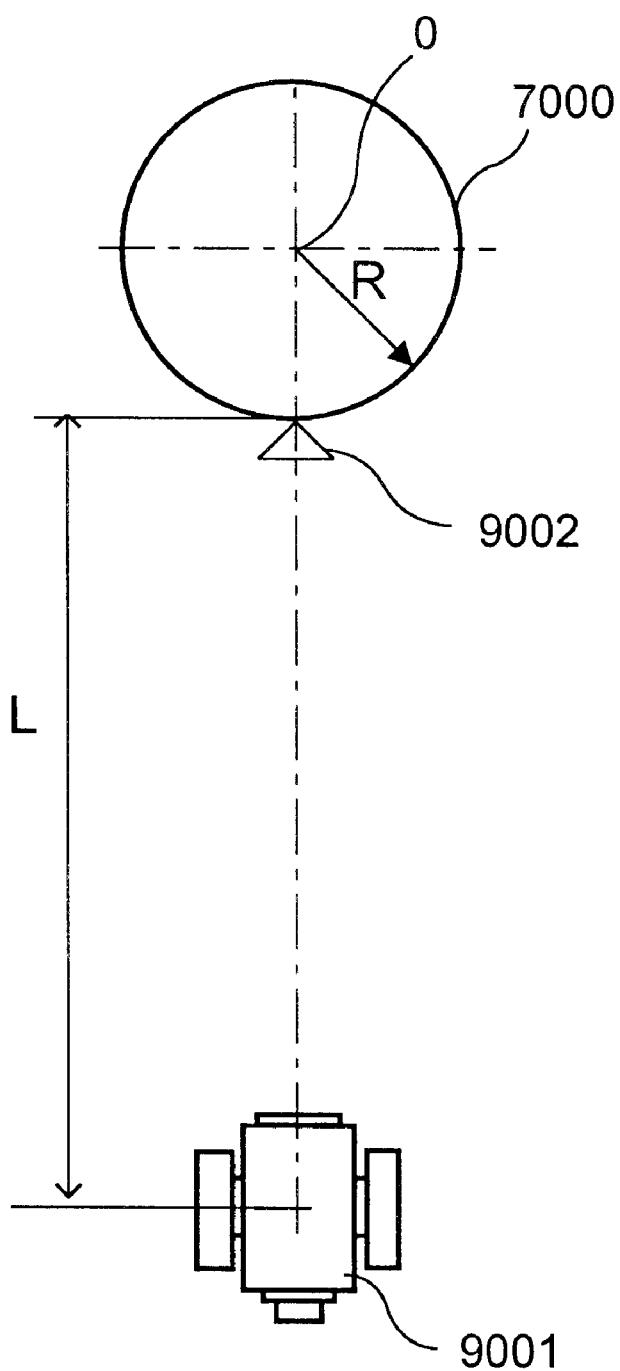
FIG. 9 is a diagram for describing the further prior art.

FIG. 4 shows the structure of a lightwave range finder 1000 according to the present embodiment, which does not make use of a corner cube. The lightwave range finder 1000 comprises an angle measuring unit 1100, a distance measuring unit 1200, a computing unit 1300, a storage unit 1400, an external input/output unit 1500, an input keyboard 1600, and a display unit 1700.

The angle measuring unit 1100 is used to collimate an object to be measured to thereby measure each angle thereof. The angle measuring unit 1100 comprises a horizontal angle measuring part 1110 and an altitude angle measuring part 1120.

The distance measuring unit 1200 is used to measure a distance to an object to be measured through the use of the lightwave range finder.

The computing unit 1300 computes the above-described determinants so as to solve simultaneous equations and carries out the entire control of the lightwave range finder 1000.

The storage unit 1400 is a memory and is required to execute computations together with the computing unit 1300. The external input/output unit 1500 is used to connect a memory card or the like which is an external storage medium for performing a measuring program, data input, the output of the result of measurements, the result of computation or the like, etc.

Incidentally, the memory card corresponds to an electronic storage medium. The present electronic storage medium is not limited to the memory card. Any of external storage media such as a floppy disk, a CD, a DVD, an MO, etc. can be used.

The input keyboard 1600 is used to allow a user to input instructions or necessary data. The display unit 1700 is used to monitor the input instructions or data and display the result of computation thereon.

One example of the operation of the present embodiment will next be described with reference to FIG. 5.

In Step 1 (hereinafter abbreviated as S1), the points A, B and C on the α surface of the building 6000 shown in FIG. 1 are first measured to thereby obtain data about distances and angles as viewed from the lightwave range finder 1000.

Next, in S2, the aforementioned second equation is computed to calculate an expression or equation for specifying the α surface including the three points A, B and C. Next, in S3, the four points, i.e., points a, b, c and d equivalent to the four corners of the α surface are collimated (their angles are measured). In S4, the fourth, fifth and sixth equations are solved to thereby compute the three-dimensional coordinates of the points a, b, c and d corresponding to the four corners of the a surface. In S5, the distances among the respective points a, b, c and d can be further computed, and the area (corresponding to the area formed by the four corners of the a surface) of the α surface can be calculated.

The present invention shows a surveying method and equipment or apparatus which exhibit or produce a very high degree of effect in the corner cube-free lightwave range finder 1000 capable of measuring the distances and angles. It is however needless to say that even in the case of a surveying apparatus which makes use of a normal corner cube, a similar effect can be obtained upon performing similar surveying.

The present invention constructed as described above comprises a first step for specifying at least three points on a plane α including measuring points of an object to be measured and measuring distances to and angles relative to at least the three points corresponding to the specified points as viewed from the point of origin, a second step for determining an expression or equation for specifying the plane α, using data about the distances and angles obtained in the first step, a third step for collimating the measuring points from the point of origin to measure the angles and determining an equation indicative of a straight line connecting between the point of origin and each measuring point, and a fourth step for computing a measuring point corresponding to a point where the equation for specifying the plane α, which is obtained in the second step and the equation indicative of the straight line connecting between the point of origin and each measuring point intersect. Therefore, the present invention can bring about an excellent effect in that coordinates or the like can be measured even at hard-to-measure places as in the case of the corners or the like.

INDUSTRIAL APPLICABILITY

As described above, the present invention is capable of computing arbitrary three-dimensional coordinate positions, distances and areas or the like from distance and angular data, etc. Further, the present invention can specify at least three points on a plane α including measuring points of an object to be measured, measure distances to and angles relative to at least three points corresponding to the specified points as viewed from a point of origin, determine an equation for specifying the plane α, using data about the distances and angles, collimate the measuring points from the point of origin to measure angles, determine an equation indicative of a straight line connecting between the point of origin and each measuring point, and compute a measuring point corresponding to a point where the equation for specifying the plane α and the equation indicative of the straight line connecting between the point of origin and each measuring point intersect.

What is claimed is:

1. A three-dimensions measuring method, comprising the following steps:

a first step for specifying at least three points on a plane α including measuring points of an object to be measured and measuring distances to and angles relative to at least three points corresponding to the specified points as viewed from a point of origin;

a second step for determining an equation for specifying the plane α, using data about the distances and angles obtained in said first step;

a third step for collimating the measuring points from the point of origin to thereby measure angles and determining an equation indicative of a straight line connecting between the point of origin and said each measuring point; and a fourth step for computing a measuring point corresponding to a point where the equation for specifying the plane α, which is obtained in said second step and the equation indicative of the straight line connecting between the point of origin and said each measuring point, said equation being obtained in said third step, intersect.

2. A three-dimensions measuring method as defined in claim 1, wherein said point of origin is a point where a surveying apparatus is installed.

3. A three-dimensions measuring method as defined in claim 2, wherein said surveying apparatus is a lightwave range finder freed from the use of a corner cube.

4. A three-dimensions measuring method as defined in any of claims 1 to 3, wherein the object to be measured is a three-dimensional object, the plane α is one surface of the three-dimensional object, and the measuring points are corners on the plane α.

5. A three-dimensions measuring method as defined in any of claims 1 to 3, wherein the measuring points are two points and further including a fifth step for computing three-dimensional coordinates of the two points and computing the distance between the two points.

6. A three-dimensions measuring method as defined in any of claims 1 to 3, wherein the measuring points are at least three points and further including a fifth step for computing three-dimensional coordinates of at least the three points and computing an area surrounded by these points.

7. A three-dimensions measuring method, comprising the following steps:

a first step for specifying at least three points on a plane α including measuring points of an object to be measured and measuring distances to and angles relative to at least three points corresponding to the specified points as viewed from a point of origin;

a second step for specifying at least three points on a plane β including measuring points of an object to be measured and measuring distances to and angles relative to at least three points corresponding to the specified points from the point of origin;

a third step for determining an equation for specifying the plane α, using data about the distances and angles obtained in said first step;

a fourth step for determining an equation for specifying the plane β, using data about the distances and angles obtained in said second step;

a fifth step for collimating the measuring points from the point of origin to thereby measure angles and determining an equation indicative of a straight line connecting between the point of origin and said each measuring point;

a sixth step for computing a measuring point corresponding to a point where the equation for specifying the plane α, which is obtained in said third step and the equation indicative of the straight line connecting between the point of origin and said each measuring point, which is obtained in said fifth step, intersect; and a seventh step for computing a measuring point corresponding to a point where the equation for specifying the plane β, which is obtained in said fourth step and the equation indicative of the straight line connecting between the point of origin and said each measuring point, which is obtained in said fifth step, intersect, and wherein at least two points corresponding to the measuring point on the plane α and the measuring point on the plane β are common.

8. A three-dimensions measuring method as defined in claim 7, wherein said point of origin is a point where a surveying apparatus is installed.

9. A three-dimensions measuring method as defined in claim 8, wherein said surveying apparatus is a lightwave range finder freed from the use of a corner cube.

10. A three-dimensions measuring method as defined in any of claims 1 to 3 or 7 to 9, wherein said specified points are four or more points and the plane is specified by a least square method.

11. A measuring method, comprising the following steps:
a first step for measuring a distance to an external surface of a cylindrical column corresponding to an object to be measured;

a second step for collimating the outside shape of the cylindrical column to thereby measure an angle thereof; and a third step for computing a distance to the center of the cylindrical column from the distance obtained in said first step and the angle obtained in said second step or the radius of the cylindrical column by a tri-square theorem.

12. A surveying apparatus which is a lightwave range finder for measuring distances and angles, said lightwave range finder including, an angle measuring unit and a distance measuring unit;

said angle measuring unit and said distance measuring unit measuring distances to and angles relative to at least three specified points on a plane α including measuring points of an object to be measured, said angle measuring unit measuring angles relative to each individual measuring points; and a computing unit for determining an equation for specifying the plane α from the distances to and angles relative to the specified points, determining an equation indicative of a straight line for connecting the measuring points from the angles relative to the measuring points, and computing a measuring point corresponding to a point where the plane a and the straight line intersect.

13. A surveying apparatus as defined in claim 12, wherein the object to be measured is a three-dimensional object, the plane α is one surface of the three-dimensional object, and the measuring points are corners on the plane α.

14. A surveying apparatus as defined in claim 12 or 13, wherein the measuring points are two points and said computing unit computes three-dimensional coordinates of the two points and computes the distance between the two points.

15. A surveying apparatus as defined in claims 12 or 13, wherein the measuring points are at least three points and said computing unit computes three-dimensional coordinates of at least the three points and computes an area surrounded by these points.

16. An electronic storage medium such as a memory card, a floppy disk, a CD, a DVD, an MO or the like to which programs descriptive of procedures or the like for allowing an angle measuring unit to measure angles up to at least three specified points on a plane a including measuring points of an object to be measured, allowing a distance measuring unit to measure distances to at least the three specified points on the plane α including the measuring points of the object to be measured, allowing the angle measuring unit to measure angles relative to the measuring points, and allowing a computing unit to determine an equation for specifying the plane α from the distances to and the angles relative to the specified points, determine an equation indicative of a straight line connecting said measuring points from the angles relative to the measuring points, and compute a measuring point corresponding to a point where the plane α and the straight line intersect are fixed.

17. An electronic storage medium such as a memory card, a floppy disk, a CD, a DVD, an MO or the like to which programs descriptive of procedures for allowing an angle measuring unit to measure angles up to at least three specified points on a plane α including measuring points of an object to be measured and angles up to at least three specified points on a plane β including measuring points of an object to be measured, allowing a distance measuring unit to measure distances up to at least the three specified points on the plane α including the measuring points of the object to be measured and distances up to at least the three specified points on the plane β including the measuring points of the object to be measured, allowing the angle measuring unit to measure angles relative to the measuring points, and allowing a computing unit to determine an equation for specifying the plane α and an equation for specifying the plane β from the distances to and the angles relative to the specified points, determine an equation indicative of a straight line connecting said measuring points from the angles relative to the measuring points, and compute a measuring point corresponding to a point where the plane α or β and the straight line intersect are fixed.

18. An electronic storage medium such as a memory card, a floppy disk, a CD, a DVD, an MO or the like to which programs are fixed, as defined in claim 17 wherein at least two points corresponding to the measuring point on the plane α and the measuring point on the plane β are common.

19. An electronic storage medium such as a memory card, a floppy disk, a CD, a DVD, an MO or the like to which programs are fixed, as defined in any of claims 16 to 18 wherein the object to be measured is a three-dimensional object, the plane α is one surface of the three-dimensional object, and the measuring points are corners on the plane α.

20. An electronic storage medium such as a memory card, a floppy disk, a CD, a DVD, an MO or the like to which programs are fixed, as defined in any of claims 16 to 18 wherein the measuring points are two points and said computing unit computes three-dimensional coordinates of the two points and computes the distance between the two points.

21. An electronic storage medium such as a memory card, a floppy disk, a CD, a DVD, an MO or the like to which programs are fixed, as defined in any of claims 16 to 18 wherein the measuring points are at least three points said computing unit computes three-dimensional coordinates of at least the three points and computes an area surrounded by these points.

* * * * *